United States Patent [19]

Gran et al.

[11] Patent Number: 5,089,982
[45] Date of Patent: Feb. 18, 1992

[54] TWO DIMENSIONAL FAST FOURIER TRANSFORM CONVERTER

[75] Inventors: Richard J. Gran, Farmingdale; Dennis W. Berde, Melville; Hugo D. Ritucci, North Merrick, all of N.Y.

[73] Assignee: Grumman Aerospace Corporation, Bethpage, N.Y.

[21] Appl. No.: 527,959

[22] Filed: May 24, 1990

[51] Int. Cl.⁵ .......................................... G06F 15/332
[52] U.S. Cl. ................................................... 364/726
[58] Field of Search .................. 364/726, 725, 518; 382/43

[56] References Cited

U.S. PATENT DOCUMENTS

| | | | |
|---|---|---|---|
| 3,779,492 | 12/1973 | Grumet | 244/3.17 |
| 4,471,445 | 9/2984 | Pernick | 364/485 |
| 4,821,224 | 4/1989 | Liu et al. | 364/726 |
| 4,881,192 | 11/1989 | Woudsma et al. | 364/726 |
| 4,929,954 | 5/1990 | Elleaume | 364/726 |

OTHER PUBLICATIONS

Hsiao et al., "Matched filter processing of raster-scanned images: analysis", Applied Optics, vol. 15, No. 10, Oct. 1976.
Mendelsohn et al., "Digital analysis of the effects of terrain clutter on the performance of matched filters for target identification and location", SPIE vol. 186(1979).
Leib et al., "Validation of a digital simulation of an optical matched filter correlator applied to aerial reconnaissance", SPIE vol. 309 (1981).
Caulfield et al., "Computer recognition of 2-D patterns using generalized matched filters", Applied Optics vol. 21, No. 9, May 1, 1982.
Mendelsohn et al., "Matched filtering for robotic vision systems", International Conference on Intelligent Robots and Machine Vision, Cambridge, MA. Sep. 1985.

Primary Examiner—Gary V. Harkcom
Assistant Examiner—Long T. Nguyen
Attorney, Agent, or Firm—Bacon & Thomas

[57] ABSTRACT

A two-dimensional fast Fourier transform converter utilizes parallel digital fast Fourier transform processors and a frame serial processing path to convert two-dimensional images of large pixel count (512×512 or higher) and high dynamic range (16 bits of pixel intensity quantization) at a rate equal to or exceeding real time processing rate of 30 frames/second. The parallel processors are organized for performing the row and column transformations in a highly parallel and efficient manner. In one embodiment, a uni-directional processing path with segmented image data busses to streamline the data movement is used. In a second embodiment, a bi-directional processing path is utilized such that the fast Fourier transform processors perform row and column conversions sequentially, thus reducing by a factor of two the number of individual fast Fourier transform processors required. The converter includes three port SRAM working memories, toggled DRAM image frame storage memories, and a data transfer and sequence controller.

46 Claims, 8 Drawing Sheets

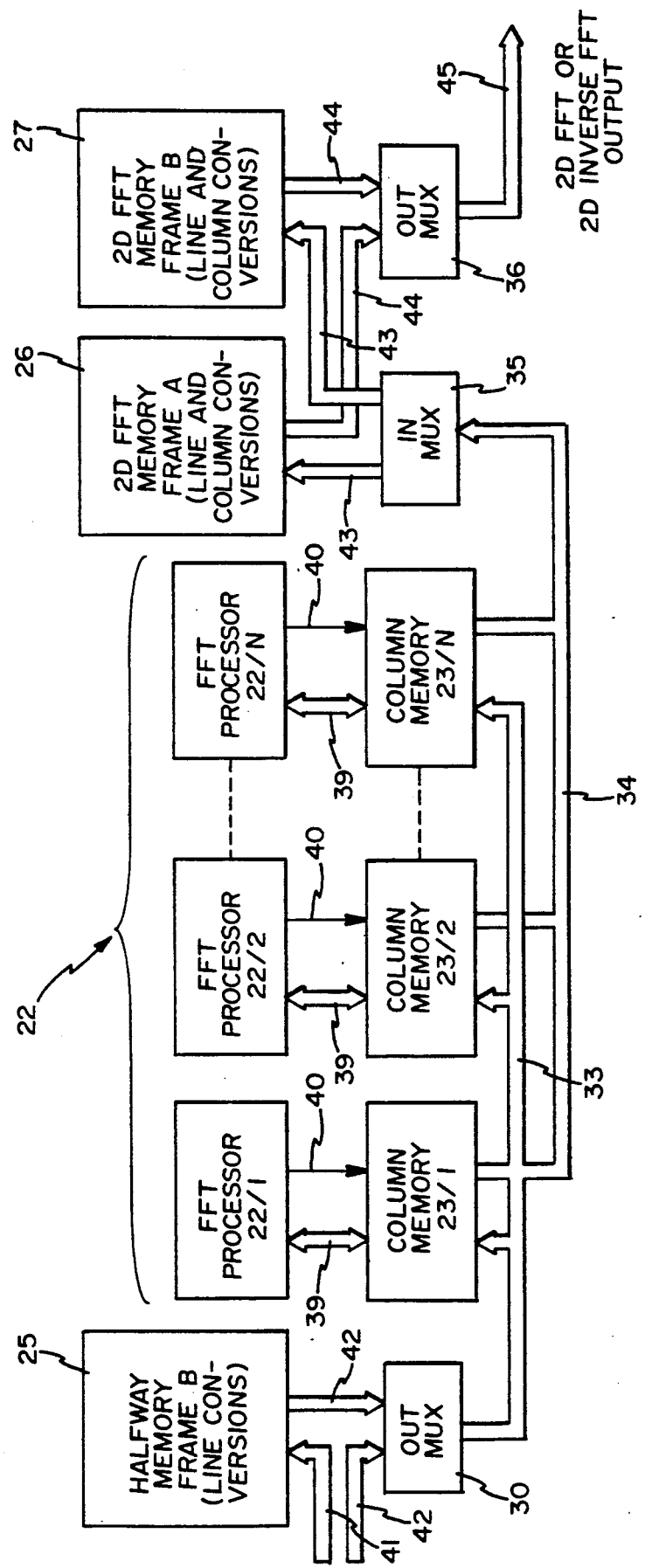
FIGURE 2 (Contd)

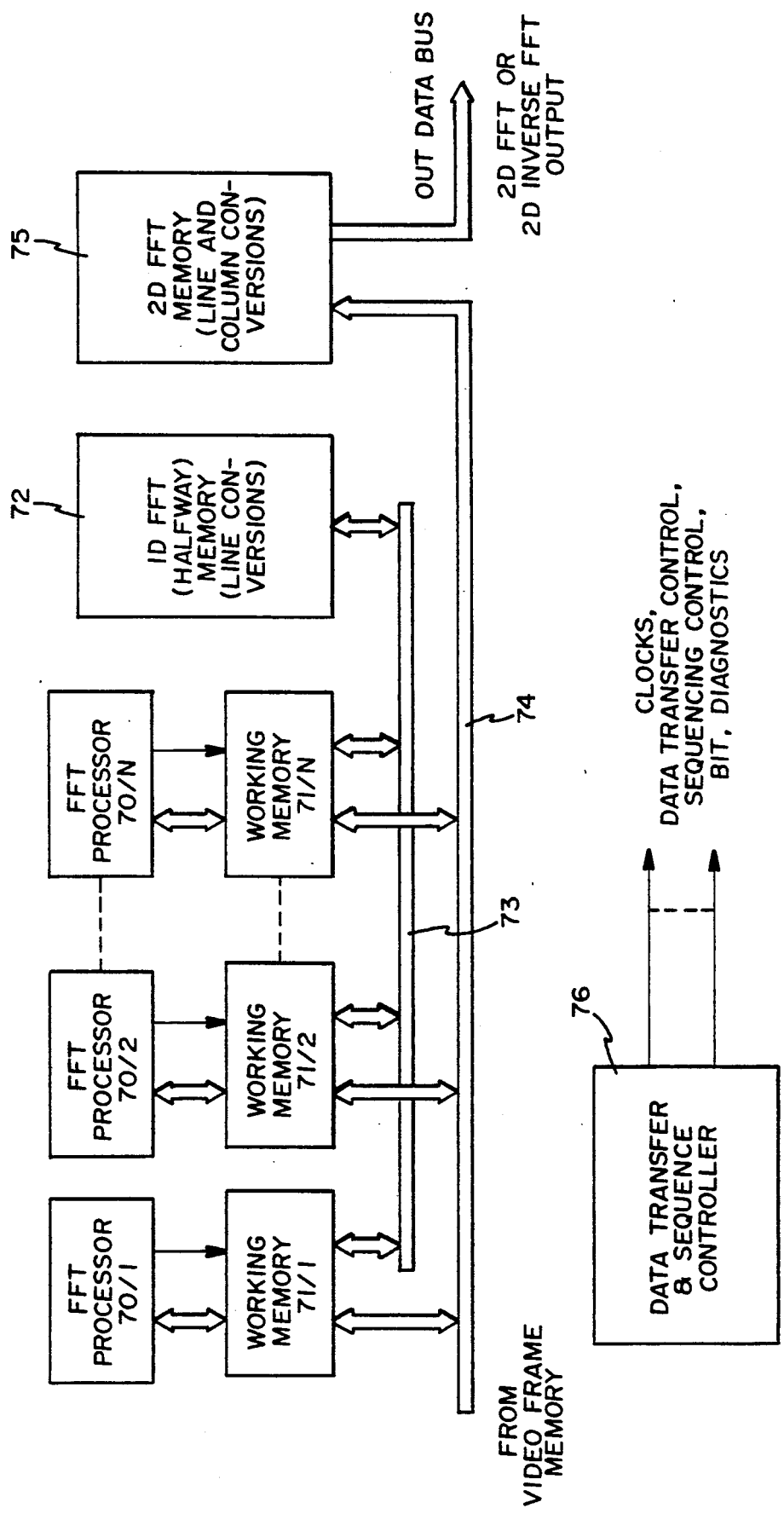

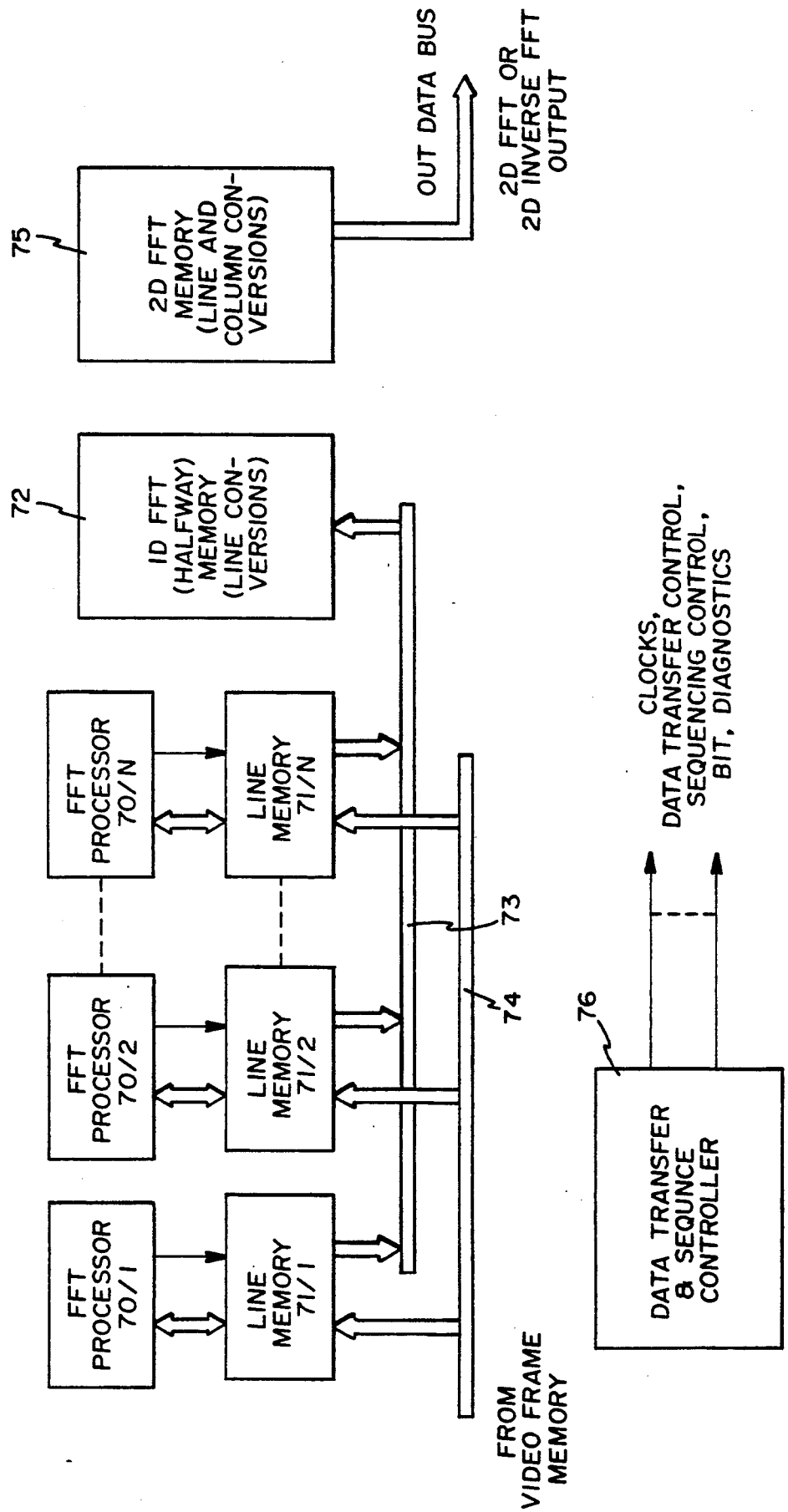

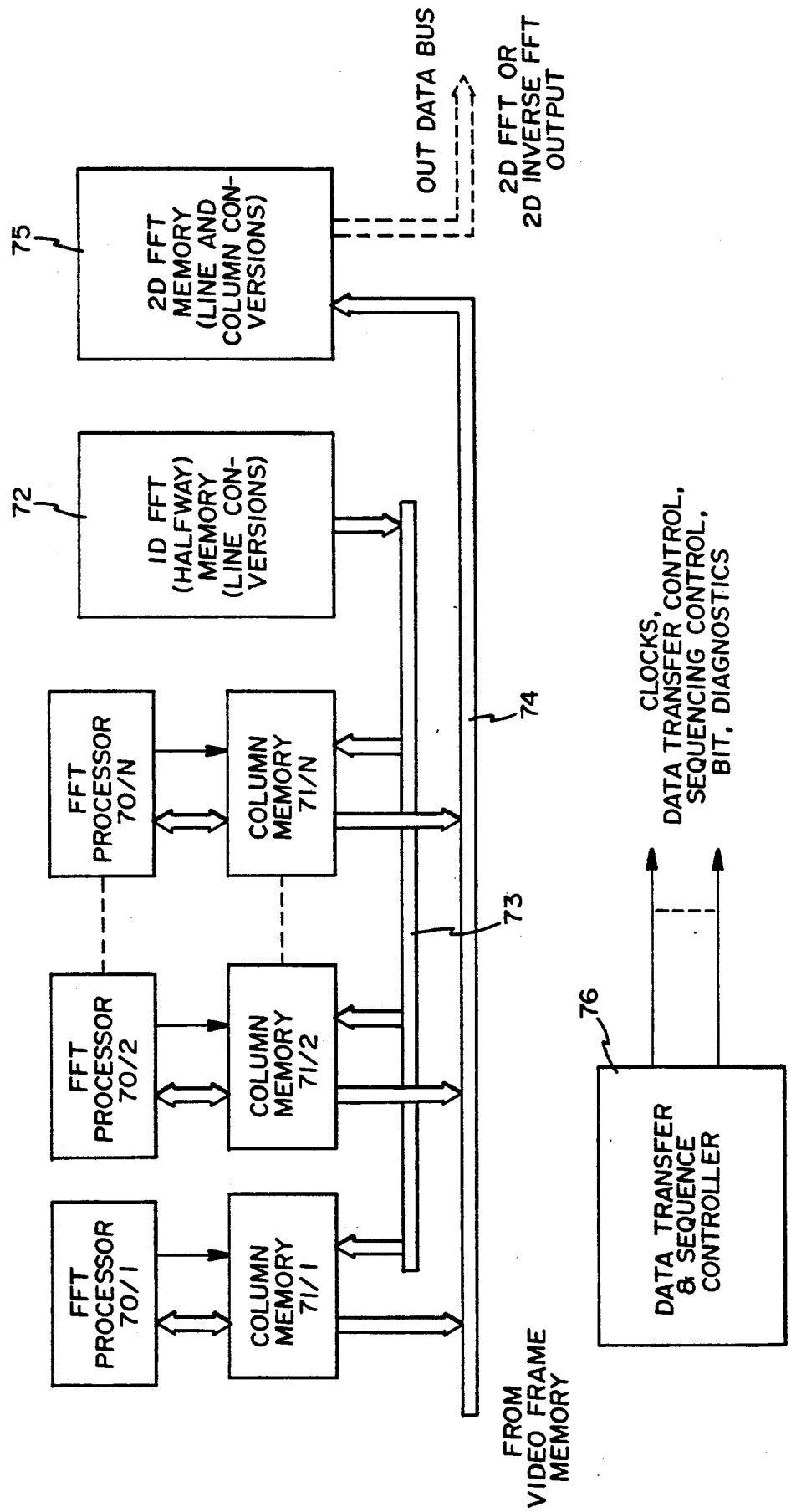

TWO DIMENSIONAL FAST FOURIER TRANSFORM CONVERTER

BACKGROUND OF THE INVENTION

I. Field of the Invention

The present invention relates to an apparatus and method for processing an image, and particularly relates to an image processor for performing a fast Fourier transform on a digitized image.

II. Description of Related Art

(i) Fast Fourier Transforms—Background

The Fourier transform has established itself as a universal solving tool for scientific and engineering problems, particularly in regard to the analysis and processing of electromagnetic signals.

The simultaneous knowledge about both the time and frequency characteristics of a signal function made possible by the Fourier transform imparts great flexibility to the scientist or engineer. Signal processing operations can often be accomplished more easily in one of either the time or the Fourier frequency domain. The existence of a Fourier transform pair for these signals provides a way of moving back and forth between the two domains.

In general, signals are most easily detected as functions of time. In many cases, however, processing of the signals turns out to be computationally extensive when attempted in the time domain, especially in the case of multi-dimensional complex signal functions such as video image signals, but may be greatly simplified if performed in the frequency domain.

As a result, the Fourier transform can be advantageously employed to simplify signal processing equipment by providing a methodology for converting time domain signal functions into frequency domain signal functions. Some examples of operations which are more easily accomplished in the frequency domain rather than in the time domain are image convolution, correlation, multiband filtering, matched filtering, phase interferometry, and echo and multipath removal.

Since the introduction of the fast Fourier transform (FFT) by Cooley and Tukey in 1965, Fourier transforms have been used in an ever widening list of applications. Brigham, in *The Fast Fourier Transform And Its Applications*, Prentice Hall, 1988, provides an extensive list of these applications. The fast Fourier transform is an efficient algorithm for computing the discrete Fourier transform of a signal function. Its applications are based on the unique ability of the algorithm to rapidly compute the Fourier, inverse Fourier, and Laplace transforms of a data point set.

Recently, the emergence of powerful small computers, as well as special purpose fast processors which have the computational power to perform the FFT algorithms, have contributed significantly to increased utilization of the Fourier transform, including the development of two-dimensional FFT converters.

(ii) An exemplary application for Fast Fourier Transform Converters—Matched Filtering An example of a particularly useful implementation of a two-dimensional fast Fourier transform converter is found in the field of video image processing, and especially in the search for, and recognition of various objects in a video image by a technique known as "matched filtering."

Matched filtering in the time domain is achieved by the convolution of an incoming image with the "matched filter" image of the object being searched for. Although accomplishing this convolution in the time domain is computationally prohibitive, the problem may be solved by taking advantage of the time-convolution theorem:

$$h(t)*x(t) \longleftrightarrow H(f) \times X(f),$$

which states that the Fourier transform of a convolution of two time domain functions $h(t)$ and $x(t)$ is the product of the Fourier transforms $H(f)$ and $X(f)$ of the two time domain functions. It therefore follows that the convolution may be accomplished in the frequency domain simply by multiplying the transformed incoming matched filter images.

In order to process an image by matched filtering, the fast Fourier transform is employed to convert the incoming video image to its frequency domain transform. The computational burden is thus shifted from performing the convolution in the time domain to accomplishing the Fourier transformation of the time domain video image into the frequency domain.

(iii) Limitations of Conventional Fast Fourier Transform Conversion Techniques Despite the advantages of converting the video image into the frequency domain before convolution, computational time using conventional digital processing arrangements can still be quite extensive. While fast Fourier transformation and convolution of an image may be accomplished using optical techniques, it would nevertheless clearly be desirable to overcome the computation time limitations of digital fast Fourier transform processing arrangements in order to enable digital implementations for image processing applications such as matched filtering. The need for an improved digital two-dimensional fast Fourier transform converters is demonstrated by the examples presented below.

In digitizing an image, a discrete number of sampled picture elements or pixels are obtained. The signal intensity of each pixel is expressed by a digital word. Each digital word is generally handled and stored as a binary coded word of length 8-16 binary digits (8 to 16 bits). A typical high resolution black and white video image frame consists of 262,144 pixels arranged as 512 lines each containing 512 pixels. The frames are supplied at a rate of 30 images per second, or 33 milliseconds per image frame. A digitized color image frame has three times this amount of data, for example a $512 \times 512$ binary coded word set for each of three colors, red, blue, and green, and is typically also supplied at a rate of 30 images per second.

Better image resolution may be achieved by providing more pixels per image. For many applications, $1024 \times 1024$ or higher pixel resolutions are required, although the standard $512 \times 512 \times 16$ black and white image is considered to be satisfactory for a large number of the above-mentioned applications.

The theory of the fast Fourier transform predicts the time it takes to perform the transform. For a series of numbers that is n points long, the time required to perform the fast Fourier transform is proportional to $n\log_2(n)$. The two-dimensional fast Fourier transform of a $512 \times 512$ pixel image requires that a fast Fourier transform be performed for each line of the image, yielding a line computation time proportional to t(line)=(512-)log$_2$(512). Also, an FFT transformation must be performed on each column of the previously line transformed image, yielding a column computation time proportional to t(column) =(512)log$_2$(512)). The total computation time for the 512 line and 512 column image is: t(2DFFT)=2×512×512×log$_2$(512).

The execution time for a 512×512 pixel two-dimensional FFT on a MACINTOSH II ™ personal computer using the Cooley-Tukey algorithm has been measured at 366 seconds. A state of the art CRAY X-MP ™ supercomputer performs the 512×512 pixel two-dimensional FFT in 900 milliseconds. When applied to matched filtering, the times required for the multiplication of the 512×512 pixel image with a corresponding matched filter image are 20 seconds for the personal computer and 50 milliseconds for the supercomputer. Impressive as the speed of the supercomputer is, even the supercomputer is too slow for image video processing at a rate which approaches the real time frame rate of 30 images per second.

(iv) Limitations in the Context of Matched Filtering

FIG. 1 is a flow diagram for a matched filtering operation performed in the frequency domain. As illustrated therein, a two-dimensional FFT conversion is performed by a 2D FFT converter 1 on a 512×512 digitized image input. The stored matched filter 2 also consists of a 512×512 digitized image and is the Fourier transform of the object being searched for in the input image. The two 512×512 pixel digitized images are multiplied in a multiplier 3 using pixel by pixel multiplication such that pixel 1 is multiplied by pixel 1, pixel 2 is multiplied by pixel 2, and so forth, completing the convolution operation in the frequency domain.

After convolution by multiplication in the frequency domain, a two-dimensional inverse FFT conversion is performed by a 2D inverse FFT converter 4 to transform the convolution results back into the time domain. The inverse transformed image is then submitted to correlation detection circuitry for determining the degree of correlation between the image input and matched filter image.

Using conventional computation techniques, therefore, the computational speed requirements of matched filtering at "real time" processing rates of 30 images per second, or approximately 33 milliseconds per image, cannot be met even with a powerful supercomputer. The supercomputer requires 50 milliseconds to perform a two-dimensional FFT conversion on a single video frame, which already exceeds the 30 milliseconds permitted for the entire matched filtering process in real time.

(v) Recent Advances—Fast Fourier Processor Chips and High Speed Memories

During the decade of the 1980s, digital signal processors made their debut. Such processors, usually on a single chip, have become available in streamlined form for rapid execution of digital signal processing operations such as digital filtering and FFT transformation. Being single chip processors, the cost of these digital signal processors (DSP's) is significantly less than the cost of a general purpose computer.

Also during the decade of the 1980s, there was a proliferation of very high speed memory devices. Static random access memory chips with access times as low as 10 nanoseconds have now become available. The combination of fast digital processors, fast memories, and equally fast support circuitry has opened up the possibility of developing economically and architecturally feasible image processing systems which can process input images at rates which approach "real time" rates, i.e., within the 30 frames/second rate of the NTSC television standard.

The time required to perform a 512×512 2D complex FFT by some of these processors ranges from less than 300 milliseconds to about 1500 milliseconds. For a 1024×1024 2D FFT, the time increases to between 1000 and 6000 milliseconds. Nevertheless, while the times are relatively fast, none of the current digital signal processors can perform a two-dimensional FFT in the allocated 33 milliseconds. Furthermore, for many image processing applications, processing rate of significantly higher than 30 images/second are required. For some applications, processing rates of 1000 images/second or higher may be required.

SUMMARY OF THE INVENTION

It is an object of the invention to provide a fast Fourier transform converter unit which overcomes the drawbacks of the prior art and which is capable of being used for applications such as real time matched filter image processing.

It is another object of the invention to provide a fast Fourier transform converter unit which is capable of performing a two-dimensional FFT conversion on a 512×512 pixel image at an image processing rate of faster than 30 images/second.

It is a further object of the invention to provide a digital signal processing architecture for a fast Fourier transform converter which builds on the performance capabilities of the individual processing components, resulting in a unit whose performance approaches the collective total of the individual component's performance.

It is a still further object of the invention to provide image storage and digital signal processor working memories organized to maximize the processing speed of corresponding individual digital signal processor units of a digital fast Fourier transform converter.

A final object of the invention is to provide a digital signal processing architecture which is easily scaleable both up and down in complexity and performance, thereby allowing the most economical configuration to meet a specific performance requirement.

These objects are achieved by providing a pipelined parallel processing architecture which utilizes individual digital signal processors and working memories arranged in parallel to achieve a unit processing rate which approaches that of the individual digital signal processors.

A total of N individual processors are supplied sequentially with successive lines of an image frame via respective individual processor working memories such that when the Nth working memory has been supplied with the Nth line of the image frame, the first processor has completed its line transformation and the corresponding first working memory has been cleared and is ready to receive the (N+1)th line of the image frame. At this time, all N processors are working simultaneously for maximum line transformation efficiency.

The invention also provides a serial processing path in which input image data enters a pipeline and the signal processing steps are accomplished time sequentially, permitting operations on successive frames to be performed simultaneously.

Each fast Fourier transformed line of the image is stored in a halfway frame memory to form a line-transformed image frame. In a first preferred embodiment of the invention, the line-transformed image frame is supplied to a total of N FFT column processors, one column at a time in sequence. At the same time, the N FFT line processors are supplied with a second image frame, minimizing the frame processing time.

In a second preferred embodiment of the invention, the above-mentioned line transformed image frame is returned sequentially, column by column, along a bi-directional internal data bus to the same set of N individual FFT processors and corresponding working memories that performed the FFT line conversions. Although using the same set of N processors and working memories prevents simultaneous processing of two image frames, it reduces by a factor of two the number of individual components needed to perform the complete two-dimensional fast Fourier transform conversion.

Organization of the individual processors and working memories, and their interconnections is obtained by using a three port real and imaginary working memory configuration, the processors being arranged to control their own access to the working memories in order to make multiple data access passes during the fast Fourier transform line or column conversion process.

Finally, controller circuitry is provided that meets special requirements of the unique fast Fourier transform processor architecture of the invention. The controller circuitry provides control and address signals to support the data load, unload, and FFT conversion operations of a large number of processors working in parallel, in addition to controlling memory access, refresh, and other internal control operations.

BRIEF DESCRIPTION OF THE DRAWINGS

FIG. 5 is a block diagram of a fast Fourier transform converter according to a second preferred embodiment of the invention.

FIG. 6 is a block diagram showing the line transformation data flow for the converter of FIG. 5.

FIG. 7 is a block diagram showing the column transformation data flow for the converter of FIG. 5.

DESCRIPTION OF THE PREFERRED EMBODIMENTS

Figure 1:
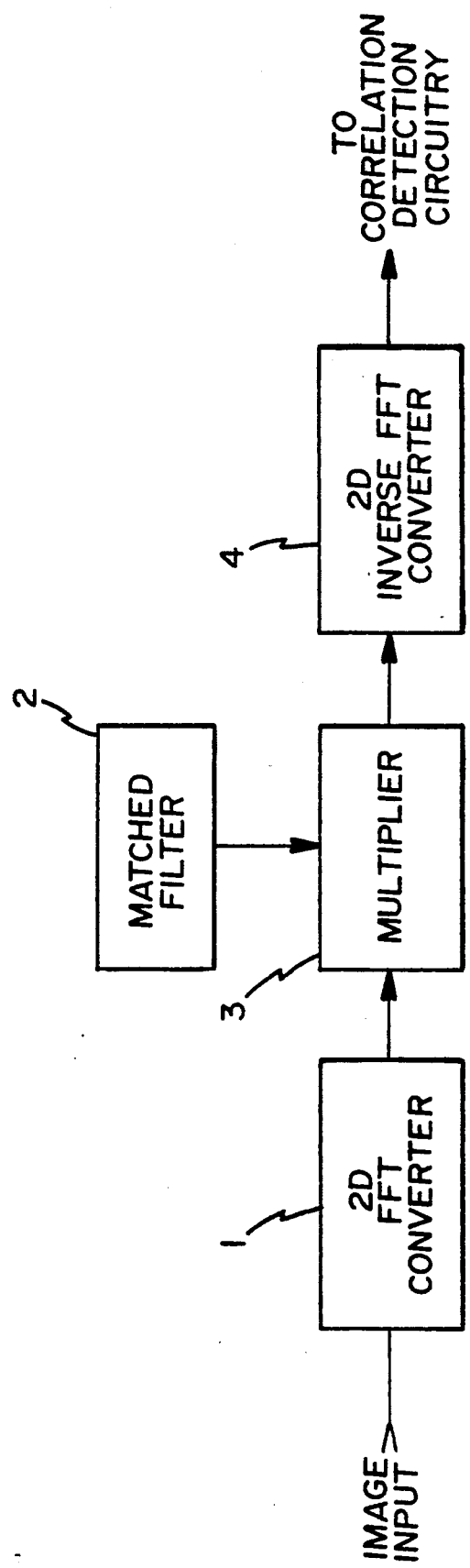
FIG. 1 is a block diagram illustrating generally a matched filtering application in which the fast Fourier transform converter of the invention may be used.
Figure 2:
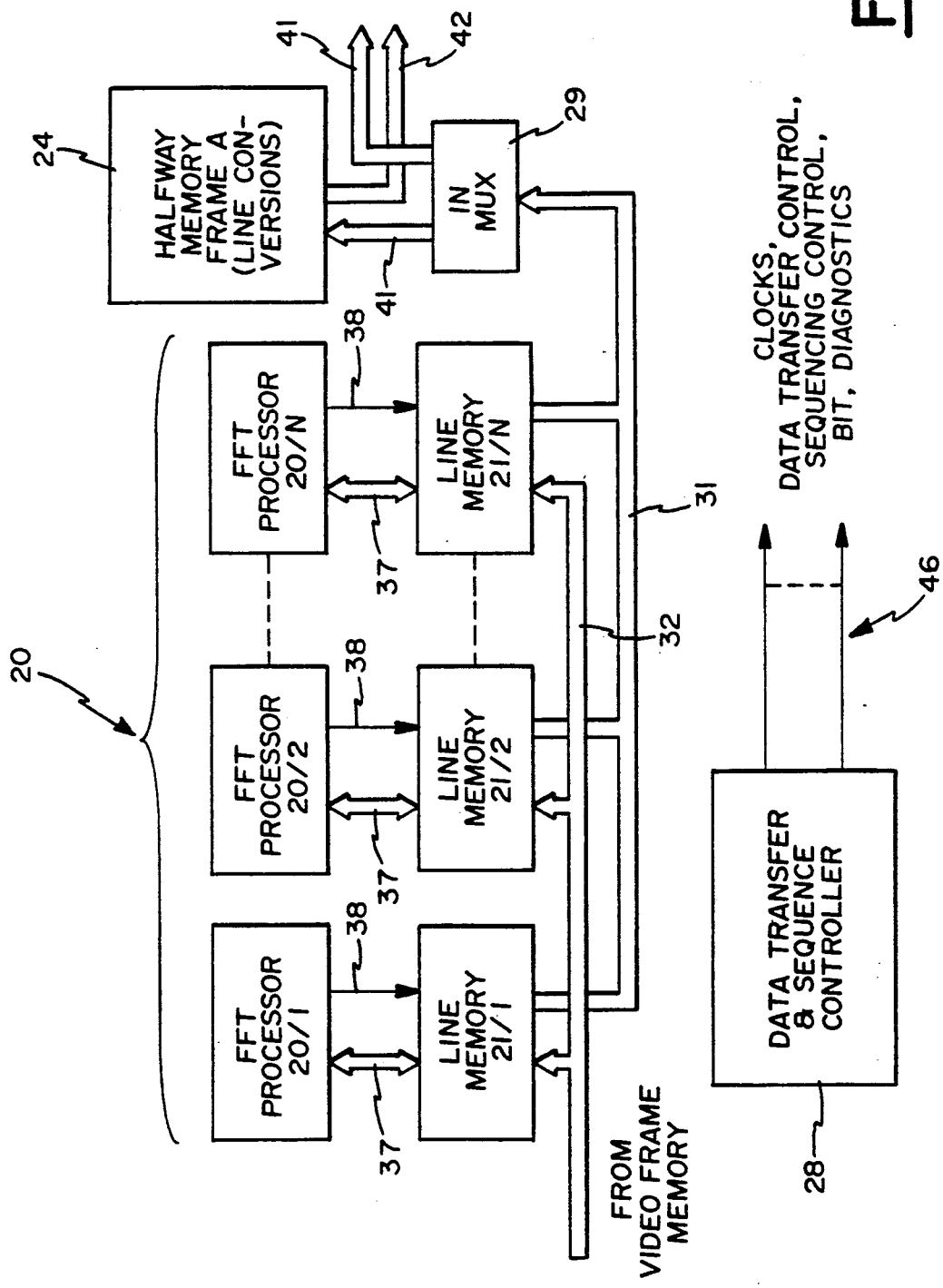
FIG. 2 is a block diagram of an FFT converter according to a first preferred embodiment of the invention.

FIG. 2 is a block diagram showing a pipelined parallel processing fast Fourier transform converter architecture according to a first preferred embodiment of the invention. The FFT converter schematically depicted in FIG. 2 performs the fast Fourier line transformations of a two-dimensional digitized image input using a total of N processors each of which transforms one line at a time. The N processors are connected to a frame memory 24, which stores the line-transformed lines or rows of the image to form a complete line-transformed image frame.

The fast Fourier transform converter of FIG. 2 also performs the column transformations of the two-dimensional image frame using a total of N additional FFT column processors. The transformed lines of the image stored in half-way memory 24, are input column by column into FFT column transform processors 22, with the results of the transformations being stored in frame memory 26. The total number of processors used in the embodiment of FIG. 2 is therefore 2N.

This type of "pipelined parallel processing" architecture generally has two advantages: First, the amount of time required to perform the line transforms or column transforms on an entire frame approaches that of the processing time for a single line, which is currently as fast as 260 microseconds. Also, further minimizing processing time, a second frame be line-transformed at the same time that the column processors are performing the fast Fourier column transformation.

A variation of the first preferred embodiment, shown in FIGS. 5–7, will be explained in more detail below. The embodiment of FIG. 2 uses a unidirectional processing path while the embodiment of FIGS. 5–7 uses a bi-directional data flow path. The second embodiment sacrifices the advantage of simultaneous line and column transforms on successive image frames but offers the advantage of a reduction in the number of components required.

The two-dimensional fast Fourier transform converter of FIG. 2 includes line and column parallel FFT conversion sections 20 and 22, respectively, half-way and completed frame storage memories 24–27, and data transfer and sequence controller 28. It will be appreciated that the FFT converter illustrated in FIG. 2 may also be used as a two-dimensional inverse FFT converter since the algorithmic operations for forward and inverse fast Fourier transforms are essentially identical.

Data is input to the line processing section 20 via an input data bus 32. The two-dimensional FFT converter of the preferred embodiment is designed to operate on data in the form of high resolution video images, i.e., on images having a relatively large pixel count and small quantization level, the pixels being represented by words of 16 bits or longer, although other pixel formats may be substituted as will be appreciated by those skilled in the art.

In order to obtain the input data, known image capture devices and digitalization circuits may be used. It is intended that the FFT converter described herein may be used with any of a large variety of video input devices and analog to digital conversion circuits known to those skilled in the art. The image input may be processed using conventional video processing techniques prior to conversion, and stored in a video frame memory (not shown) to which image input bus 32 is connected.

Line FFT conversion section 20 includes a total of N fast Fourier line transform processors 20/1–20/N and a total of N line memories 21/1–21/N which function as working memories for the N line processors. Column FFT conversion section 22 includes a total of N fast Fourier column transform processors 22/1–22/N corresponding column memories 23/1–23/N which serve as working memories for the N FFT column processors. Data output of line-transformed data sets from line conversion section 20 occurs along data output bus 31 while output of column-transformed data sets from column conversion section 22 occurs via data output bus 34.

The FFT converter shown in FIG. 2 operates as follows under the control of data transfer and sequence controller 28, details of which will be further described in connection with FIG. 4. First, a data set representing one line of the image is moved into line memory 21/1 from a video frame memory (not shown) containing a digital image frame. The digital image frame has preferably been windowed and processed using standard video image processing techniques prior to storage.

As soon as line memory 21/1 has been loaded, FFT processor 20/1 starts a fast Fourier line transform of the input data set. Loading of a second data set representing a second line of the image frame into line memory 21/2 begins immediately following completion of loading of line memory 21/1. Again, as soon as line memory 21/2 is loaded with the second line of the image, FFT processor 20/2 starts its conversion, either in response to a timing signal from controller 28 or in response to detection of loading. This sequence of data loading operations continues until line N of the image has been loaded into line memory 21/N.

The number N is selected such that the loading of the Nth line of the image coincides in time with the completion of the first FFT line transformation by FFT processor 20/1. The transformed-line data in working memory 21/1 is now moved via output data bus 31 to half-way frame memory 24 through an input multiplexer 29. Having thus cleared line memory 21/1, the next line, line N+1 of the image, may then be moved into line memory 21/1. When line memory 21/1 is loaded, FFT processor 20/1 begins the conversion of the N+1th line of the image.

Data from line N+2 of the image frame is loaded into line memory 21/2 following loading of line memory 21/1, and so forth. This sequence of operations continues until all lines of the image have undergone a line FFT conversion. Each memory preferably uses physically discrete input and output busses 32 and 31, respectively, which facilitate data movement by preventing interference between the loading and unloading operations when two operations take place simultaneously at different line memories as will be described below.

After all lines of the first input image frame have undergone a line FFT conversion, the column FFT conversions may begin. At this time, the data flow status is as follows: the first digital image frame has been input sequentially, one line at a time, into line conversion section 20, processed, and the image is now stored in half-way frame memory 24. Column conversions are performed in exactly the same manner as the line transformations, using input data bus 33, fast Fourier column transform processors 22/1-22/N, and working column memories 23/1-23/N.

While column conversions are being performed in column conversion section 22, a second input image frame (B) may be input into line memories 21/1-21/N in exactly the same manner as occurred in respect to the first input image frame (A). Thus, during the next processing time interval, the frame A column conversions and the frame B line conversions will be carried out simultaneously. As the first line of the second input image frame is loaded into line memory 21/1, a first column of the first input image frame A is moved from half-way memory 24 to column memory 23/1.

By the time N lines of image frame B and N columns of image frame A have been loaded into respective line memories 21/1-21/N and 23/1-23/N, processors 20/1 and 22/1 will have completed their respective line and column transform operations. However, at this time, a portion of line converted frame A will still be present in halfway memory 24. Therefore, the output of line memory 21/1 cannot be stored in halfway memory 24.

Instead, the output of line memory 21/1 is placed into halfway frame memory 25 by input multiplexer 29 under the control of the data transfer and sequence controller 28. Also, the output from column memory 23/1 is placed in two-dimensional frame memory 26 by input multiplexer 35. Subsequently, when N columns of frame B have completed processing, multiplexer 35 will place the outputs of working column memories 23/1-23/N into two-dimensional frame memory 27.

In the same manner as described above, when line memory 21/1 has been cleared of the line-transformed (N+1)th line of frame B, now stored in halfway frame memory 25, the (N+1)th line of the frame is input along input bus 32. Simultaneously, the line-transformed first line of frame A is output from the halfway memory 24 via multiplexer 30 and bus 33 to column memory 23/1.

The sequence of loading and conversion operations continues until the column conversions for the first frame and the row conversions for the second frame have been completed. The two-dimensional fast Fourier transform of the first image frame now resides in two dimensional frame memory 26, and a third frame is ready for processing by the line conversion section 20.

As the processing of the third frame begins, the halfway memories 24 and 25 are "toggled" and the third frame line conversion results are placed in halfway memory 24 by multiplexer 29. Similarly, the two-dimensional FFT memories 26 and 27 are also "toggled" and the second frame column results are placed in memory 27 via multiplexer 35. The two-dimensional fast Fourier transform of the first frame is shifted via output multiplexer 36 over an output bus 45 for further processing.

Figure 3:
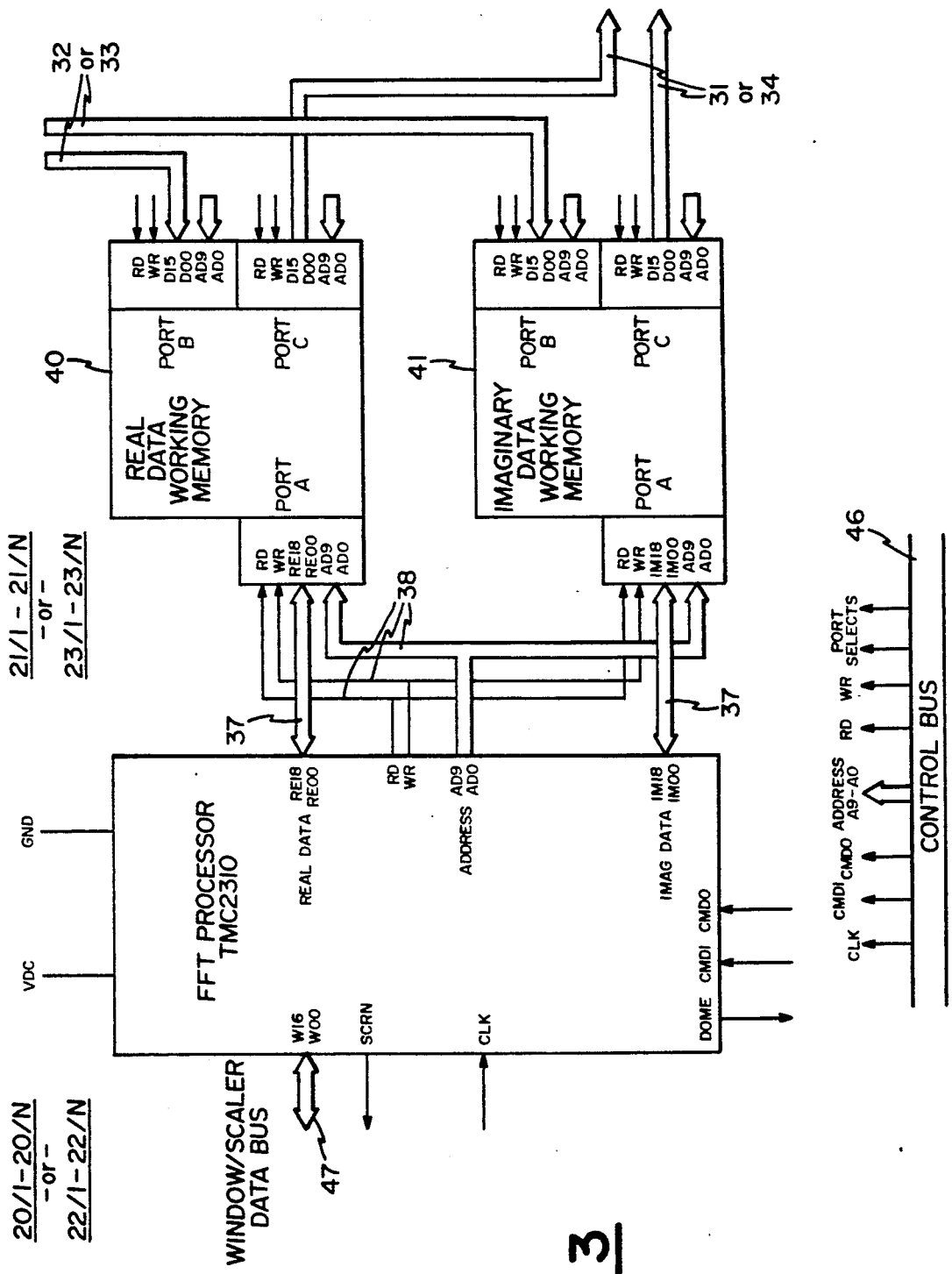
FIG. 3 is a block diagram of the working memories and the working memory/FFT processor interconnections of the preferred embodiment of FIG. 2.

FIG. 3 shows a preferred implementation of working memories 21/1-21/N and 23/1-23/N and the manner in which they are connected. The working memory provides storage for both the real and imaginary portions of the video image data set, and are identical for both line and column processing. Complementary real and imaginary working memories 40 and 41 are provided because, even when the input image contains only real data, the fast Fourier transformation gives rise to an imaginary part which must be retained.

Each of the respective real and imaginary working memories 40 and 41 includes three ports. For the preferred 512×512 16 bits/word image processor, a preferred arrangement of the three ports A, B and C is as follows: Data pins D00-D15 on ports B and C are connected to one of input or output data busses 31-34, while read request pins RD, write request pins WR, and address pins AD0-AD9 are connected to sequence controller 28 via control bus 46. Control of the memory inputs and outputs to respective input and ouput data busses occurs via the read and write request pins and the address signals generated by the controller to direct the line and column data sets through the data paths and frame memories.

Port A is connected to one of the FFT processors 20/1-20/N or 22/1-22/N. The exemplary processor shown in FIG. 3 is marketed by TRW with component designation TMC 2310, although it should be realized that the invention is not intended to be limited to any particular FFT processor. Those skilled in the art will appreciate that the invention may be adapted for use with a variety of FFT processors.

The FFT processor includes 19 real data inputs RE00-RE18, and 19 imaginary data bit inputs IM00-IM18. These are connected via a data bus to corresponding inputs in port A of the respective real data and imaginary data working memories 40 and 41. The FFT processor also includes a read request terminal RD connected to a read request pin RD in port A and a write request terminal WR connected to a corresponding pin WR also in port A. Control lines 38 are connected between the respective pins on the working memories in a manner known to those skilled in the art.

The processor issues data request and send signals over the RD and WR lines in order to read from the working memories and also to order the working memories to accept the output from the processor. Address bit pins AD0-AD9 are connected to corresponding pins on the respective ports of the two memories 40 and 41 for data flow control.

Movement of data between the processor and memories over bus 37 during performance of the Fourier transform algorithm is entirely under the control of the processor via control lines 38. Thus, the processor is able to request the data set stored in the memories as needed, minimizing computation time. It is also possible to sequence the data access operations for each processor using the central controller and/or memory, but this would entail a great increase in system complexity and computation time.

Control bus 46, also shown in FIG. 3, includes a plurality of address lines A9-A0 connected to ports B and C on the working memories 40 and 41, and read and write request lines RD and WR also connected to corresponding pins on ports B and C of the working memories. Also included is a clock line connected to a clock pin on the FFT processor and command lines CMD0 and CMD1 on the FFT processor.

These lines, along with port selects for each of the working memories, are connected to data transfer and sequence controller 28 which controls the clocks, data transfer control, sequence control, bit, and diagnostics via the above mentioned lines. A separate data bus 47 may also be provided to input windowing coefficients for preventing distortions during Fourier transformation caused by the discontinuous nature of a single image frame.

The FFT processor of the preferred embodiment performs a radix-2 decimation-in-time fast Fourier transform or inverse fast Fourier transform algorithm. This algorithm requires the processor to make multiple passes through the data set. A "pass" is defined as one arithmetic operation performed on the entire data array. This mode of operation requires repeated fetch and store operations on the data from the working memories. The fetch and store operations are controlled by the FFT processor via the RD and WR pins. The data itself is transferred along the buses connected to pins RE00-RE18 and IM00-IM18 using address bits carried by the bus connected to address pins AD0-AD9. Thus, the processor generates all address and control signals for the working memory, during the FFT conversion, via port A in FIG. 4.

Figure 4:
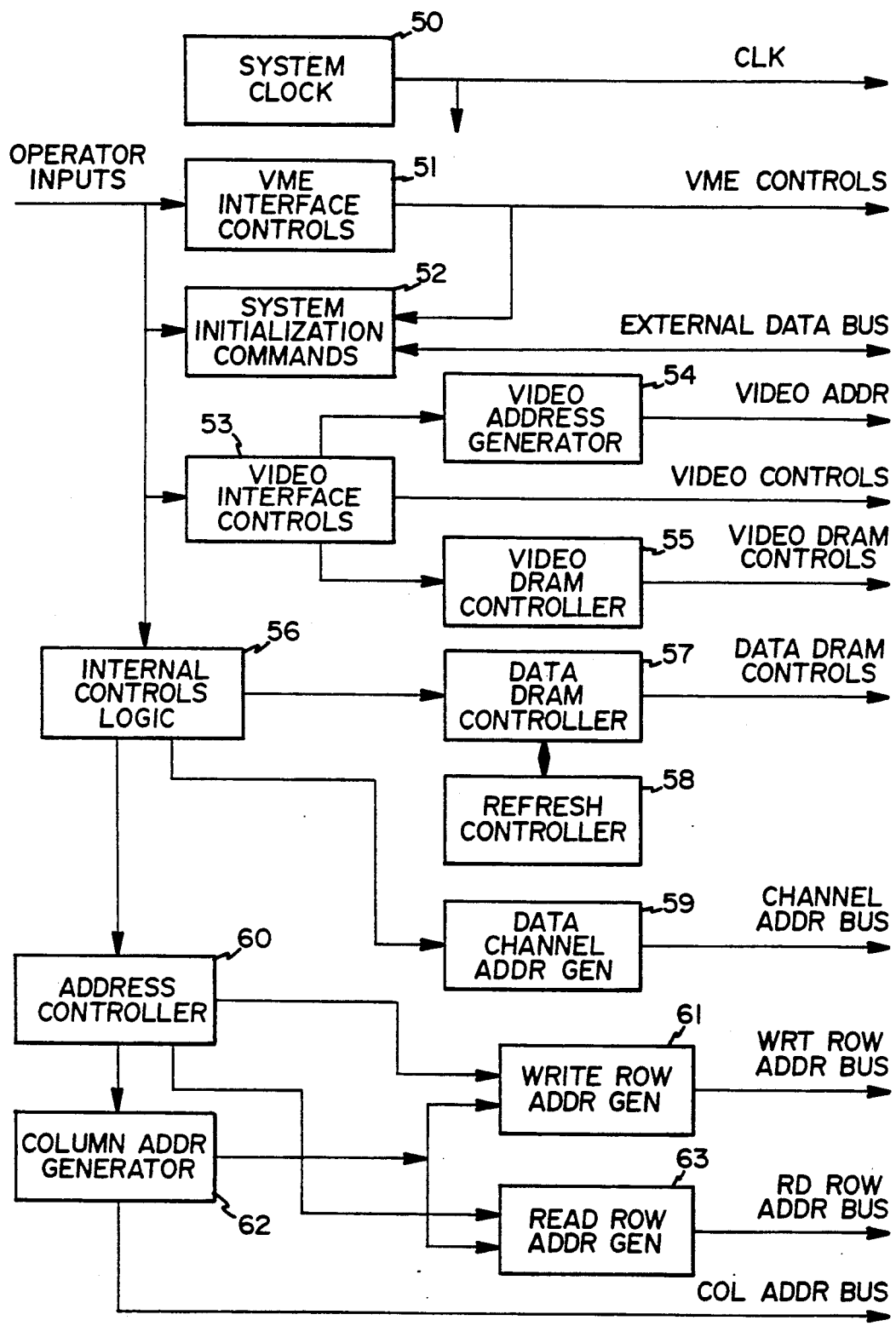
FIG. 4 is a block diagram of the control circuitry for the fast Fourier transform converter of FIG. 2.

A block diagram of controller 28 is shown in FIG. 4. Controller 28 provides the control signals for keeping the highly parallel two-dimensional FFT converter operating efficiently and in synchronism. The operations of processors 20/1-20/N and 22/1-22/N in the respective line and column conversion sections 20 and 22 share a great deal of commonality, and the controller takes advantage of the operational similarities.

It should be noted that the individual components 50-63 of the controller are each individually known to those skilled in the art, and that details thereof have therefore been omitted for simplicity. The various command and address generators may, as is known, take the form of either dedicated circuitry or computer software.

As illustrated in FIG. 4, a system clock section 50 provides clock signals for synchronous unit operation. A VME (Versa Module Europa) interface controls section 51 distributes commands to the entire unit, via a VME bus. Operator inputs are received and responded to by section 51, system initialization command section 52, video interface control section 53, and internal controls logic section 56.

When a power-on signal is received by the system initialization commands block 52, various initialization functions are performed including performing system diagnostics. As data is moved along the processing path during system operation and loaded into or fetched from the various memories, source and destination addresses are provided by the address generation blocks of the controller, including address controller 60, write and read row address generators 61 and 62, and column address generator 63, as well as data channel address generator section 59, which are connected to the various buses or lines as indicated.

Address and operating controls for the video frame memories 24-27 include video interface controls 53, video address generator 54, and video dynamic RAM controller 55. Memory address generation is well known and therefore details thereof have been omitted although they will be readily implemented by those skilled in the art.

The FFT processor's working memories 21/1-21/N and 23/1-23/N are preferably static random access memory (SRAMs) which do not require any refresh operation. The halfway and two-dimensional FFT memories 24-27, however, are preferably dynamic random access memories (DRAMs) which require regular periodic refresh operations. One refresh controller is indicated at block 58. The control signals for DRAM refresh are generated and supplied by the video and data DRAM controllers 55 and 57, the former controlling an operator interface video DRAM and the latter controlling memories 24-27.

It will be appreciated that numerous modifications of the controller will occur to those skilled in the art. For example, a VME bus is utilized in the preferred embodiment, but numerous other digital data distribution busses may be substituted. Similarly, operator inputs may be obtained either from a dedicated operator control unit or from a computer.

FIG. 5 is a block diagram of a second preferred embodiment of the two-dimensional fast Fourier transform converter of the invention. It has been pointed out previously that no single currently existing digital signal processor or digital computer, including a supercomputer, is able to perform a two-dimensional FFT conversion of a $512 \times 512 \times 16$ video image at "real time" processing rate of less than 33 milliseconds unless a highly parallel architecture utilizing multiple digital signal processors such as is described above is employed. Nevertheless, this highly parallel architecture imposes cost and complexity penalties. A way to reduce those penalties may be achieved through combination of the line and column FFT conversion sections as shown in FIGS. 5-7.

In the preferred embodiment of FIGS. 5-7, the processing path is no longer unidirectional. Data flows in both directions on the internal data bus. The two-dimensional FFT converter depicted in FIG. 5 utilizes a total of N processors 70/1–70/N in a combined line and column conversion section 70. The converter includes a halfway frame memory 72 for the storage of a line converted image frame and a two-dimensional FFT memory 75 for storing the completely converted frame.

The converter of FIG. 5 operates as follows: Initially, as in the converter of FIG. 2, a data set representing a first line of the image is moved into working memory 71/1 via external data bus 74. As soon as working memory 71/1 is loaded, FFT processor 70/1 begins the FFT conversion on the data set. Data input for working memory 71/2 begins immediately following completion of the working memory 71/1 loading. Again, as soon as the second line of the image is loaded into working memory 71/2, FFT processor 70/2 begins its conversion operation. This sequence of data loading operations continues until the Nth line of the image has been loaded into working memory 71/N.

As with the embodiment of FIG. 2, the number N is selected such that the loading of the Nth line coincides in time with the completion of the FFT transformation by FFT processor 70/1. The transformed line data is now moved from working memory 71/1 to halfway memory 72 via internal data bus 73. Having emptied line memory 71/1, the next line, line N+1 of the image, is moved into working memory 71/1 via external data bus 74. Upon completion of loading, FFT processor 70/1 begins the conversion of the N+1 line.

Data from line N+2 is then loaded into working memory 71/2 and so forth. This sequence of operations continues until all of the lines have undergone line FFT conversions, at which time halfway memory 72 contains a line-transformed frame of the video image. Flow paths for the line transformation process are shown in FIG. 6.

At this point, unlike the converter of FIG. 2, a first column of the line transformed frame is returned along internal data bus 73 to working memory 71/1, at which time FFT processor 70/1 begins a Fourier transform operation on the column. As soon as working memory 71/1 is loaded, a second column of the line transformed frame is loaded into working memory 71/2 and so forth.

Again, the loading of working memory 71/N coincides in time with the completion of the transformation by FFT processor 70/1. The transformed column from working memory 71/1 is then stored in two-dimensional FFT memory 75 via bus 74. Thus, working memory 71/1 is free to be loaded with column N+1 from halfway memory 72 via bus 73. Processing continues in the same manner until all of the columns of the line transformed frame have been processed and transferred to the two-dimensional FFT memory 75. The data flow for the column transformations is indicated in FIG. 7.

As a result of the arrangement of FIG. 5, the number of FFT processors is reduced from 2N in the embodiment of FIG. 2 to N in the embodiment of FIG. 5, and half of the DRAM frame storage memories are eliminated. While only a single frame can be converted at a time, thus doubling the 2DFFT processing time, this embodiment entails a reduction in complexity and, with current FFT processor chip capabilities, is still able to achieve real time processing.

In order to implement the embodiment of FIGS. 5-7, the hardware of the line FFT processing section of the embodiment shown in FIG. 2 is retained and the hardware of the column FFT processing section is eliminated. Data transfer and sequence controller 76 is essentially the same as controller 28, with modifications which will be apparent to those skilled in the art based on the above description to enable data flow along the internal data buses in two directions. For this embodiment, the working memories shown in FIG. 2 do not need to be modified, but the input data buses and output data buses need to be arranged to permit the two-way data transfer.

Although two specific embodiments of the invention have been described above, it is to be understood that no part of this description should be interpreted as a limitation. Those skilled in the art will appreciate that the invention is capable of numerous modifications, alterations, and substitutions of parts without departing from the scope of the invention, which is defined solely by the appended claims.

What is claimed is:

1. A digital fast Fourier transform converter, comprising:

a two-dimensional halfway memory;

a plurality of one-dimensional fast Fourier transform processors connected in parallel to said halfway memory, each processor including means for converting one-dimensional data point sets into one-dimensional fast Fourier transformed data point sets;

data input means for supplying said processors, in sequence, one set at a time per processor, with said one-dimensional data point sets;

transformed data output means for transferring said one-dimensional fast Fourier transformed data point sets, one set at a time per processor, from said processors to said halfway memory to form a partially fast Fourier transformed data frame made up of said one-dimensional fast Fourier transformed data point sets; and second dimension transform means for transforming said partially fast Fourier transformed data frame into a completely fast Fourier transformed data frame.

2. A converter as claimed in claim 1, wherein said one-dimensional data point sets are lines of a two-dimensional input image frame and said partially transformed data frame is made up of fast Fourier transformed lines of said two-dimensional input image frame.

3. A converter as claimed in claim 1, wherein said second dimension transform means comprises column transfer means for Fourier transforming image data point sets representing columns of said partially transformed data frame; a two-dimensional image frame memory; and column storage means for storing fast Fourier transformed columns of said partially transformed data frame into said two-dimensional image memory.

4. A converter as claimed in claim 3, wherein said column transform means comprises a second plurality of one-dimensional fast Fourier transform processors connected in parallel between said halfway memory and said two-dimensional image frame memory.

5. A converter as claimed in claim 3, wherein said column transform means comprises said plurality of one-dimensional fast Fourier transform processors, and said converter further comprises column input means for transferring said columns from said halfway memory to said plurality of one-dimensional fast Fourier transform processors sequentially, one column at a time per processor, and column output means for transferring fast Fourier transformed columns from said plurality of one-dimensional fast Fourier transform processors to said two-dimensional image frame memory.

6. A converter as claimed in claim 5, wherein said transformed data output means and said column input means comprise separate input and output data busses.

7. A converter as claimed in claim 1, wherein said data input means includes means for supplying a complete video image frame made up of said data point sets to said plurality of one-dimensional fast Fourier transform processors in less than 33 milliseconds.

8. A converter as claimed in claim 1, wherein said data point sets each includes at least 512 words, said words representing pixels of a two-dimensional image.

9. A converter as claimed in claim 8, wherein each of said words has a length of at least 16 bits.

10. A converter as claimed in claim 1, further comprising, for each of said plurality of one-dimensional fast Fourier transform processors, a working memory and bus means for transferring data between the working memories and the fast Fourier transform processors.

11. A converter as claimed in claim 10, wherein each of said working memories comprises port means connected to a corresponding one of said processors via said bus means for enabling said corresponding processor to read a data point set stored in said working memory and to write a transformed data point set into said working memory.

12. A converter as claimed in claim 11, wherein each of said one-dimensional fast Fourier transform processors includes means for enabling said processor to make multiple passes via said bus means and said port means in respect to said data point sets for each Fourier transform conversion.

13. A converter as claimed in claim 1, wherein the number of said one-dimensional fast Fourier transform processors is N and the number of said data point sets is greater than N, and further comprising sequencing means for sequencing said processors such that a first of said processors to be supplied with a data point set completes a fast Fourier transform on said data point set at the same time that an Nth data point set is supplied to an Nth processor, the next data point set being supplied to said first processor.

14. A digital fast Fourier transform converter, comprising:
a plurality of fast Fourier transform line processing means for performing fast Fourier transforms sequentially on a plurality of image data point sets to form a plurality of line-transformed image data point sets, each set representing one line of a two-dimensional image frame, in order to generate a line-transformed image frame made up of said line-transformed image data point sets;
a plurality of working line memory means, each connected to one of said plurality of fast Fourier transform line processing means for storing one line of said image frame during processing of said line by a respective line processing means to which the line memory means is connected;
line input means for supplying said working line memory means, sequentially, one line at a time per line processing means, with said image data point sets;
halfway video frame memory means for storing said line-transformed image frame;
line output means connected to said working line memory means and said halfway video frame memory means for receiving said line-transformed data point sets from said working line memory means and storing said line-transformed data point sets in said halfway video frame memory means;
a plurality of fast Fourier transformed column processing means for performing fast Fourier transforms sequentially on a plurality of data point sets to form a plurality of column-transformed data point sets, each data point set representing one column of said line-transformed image frame in order to generate a complete two-dimensional Fourier transformed image frame made up of said column-transformed data point sets;
a plurality of working column memory means, each connected to one of said plurality of fast Fourier transform column processing means for storing one column of said line-transformed image frame during processing by a respective column processing means to which the column memory means is connected;
column input means for supplying said working column memory means, sequentially, one column at a time per column processing means, with image data point sets representing columns of said line-transformed image frame;
two-dimensional video frame memory means for storing said Fourier transformed image frame; and
column output means connected to said column memory means and said two-dimensional video frame memory means for receiving column transformed data point sets from said working column means and storing them in said two-dimensional video frame memory means.

15. A converter as claimed in claim 14, wherein said line input means includes means for supplying a complete frame, line by line in sequence, to said working line memories in less than 33 milliseconds.

16. A converter as claimed in claim 14, wherein said image data point sets each includes at least 512 words of at least 16 bits, each word representing an image pixel.

17. A converter as claimed in claim 14, wherein each of said plurality of fast Fourier transform line processing means comprises a fast Fourier transform line processor and each of said corresponding line memory means includes port means connected to said line processor for enabling said line processor to read a data point set stored in said line memory means and for enabling said line processor to write a transformed data point set into said line memory means.

18. A converter as claimed in claim 17, wherein said line processor includes means for enabling said line processor to make multiple passes in respect to said data point set for each Fourier transform conversion.

19. A converter as claimed in claim 14, wherein each of said line processing means comprises a fast Fourier transform line processor, and wherein each of said working line memory means includes data input port means for receiving a data point set from said line input means and data output port means for supplying a line-transformed data point set to said line output means.

20. A converter as claimed in claim 19, wherein said line memory means further comprises line processor memory control port means connected to a respective one of said line processors for supplying a data point set to said line processor and for receiving a line transformed data point set from said line processor.

21. A converter as claimed in claim 14, wherein each of said plurality of fast Fourier transform column processing means comprises a fast Fourier transform column processor and each of said corresponding column memory means includes port means connected to said column processor for enabling said column processor to read a data point set stored in said column memory means and for enabling said column processor to write a transformed data point set into said column memory means.

22. A converter as claimed in claim 21, wherein said column processor includes means for enabling said column processor to make multiple passes in respect to said data point set for each Fourier transform conversion.

23. A converter as claimed in claim 14, wherein each of said column processing means comprises a fast Fourier transform column processor, and wherein each of said column working memory means includes data input port means for receiving a data point set from said column input means and data output means for supplying a column transformed data point set to said column output means.

24. A converter as claimed in claim 23, wherein said column memory means further comprises column processor memory control port means connected to a respective one of said column processors for supplying a data point set to said column processor and for receiving a column-transformed data point set from said column processor.

25. A converter as claimed in claim 14, wherein said plurality of fast Fourier transform line processor means comprises a plurality of fast Fourier transform line processors, and wherein said line input means includes means for supplying one line of an image frame to each of said plurality of line memory means in sequence, the last of said plurality of line memory means being supplied when a line processor corresponding to a first of said line memory means to be supplied has substantially completed a Fourier transformation on one line of said image frame.

26. A converter as claimed in claim 14, wherein each of said plurality of fast Fourier transform column processing means comprises a fast Fourier transform column processor and wherein said column input means includes means for supplying one column of a line transformed frame to each of said plurality of column memory means in sequence, the last of said plurality of column memory means being supplied when a column processor corresponding to the first of said column memories to be supplied has substantially completed a Fourier transformation on a column of said line transformed frame.

27. A converter as claimed in claim 14, wherein said halfway video frame memory means comprises means for storing two line-transformed image frames, said line input means comprising means for supplying a second frame line by line in sequence to said plurality of line memory means when a first frame has been line-transformed and stored in said halfway video frame memory means by said line output means, and said column input means comprising means for supplying said first frame column by column in sequence from said halfway memory means to said plurality of column memory means while said line input means is supplying said second frame to said plurality of line memory means.

28. A converter as claimed in claim 14, wherein said line memory means and said column memory means include a complex working memory bank for each corresponding line and column processor.

29. A converter as claimed in claim 28, wherein said complex working memory bank is a static random access memory.

30. A converter as claimed in claim 28, wherein said complex working memory bank includes one real working memory and one imaginary working memory, each having a three port input/output interface.

31. A converter as claimed in claim 14, further comprising control means for providing data transfer control signals to synchronously move data point sets along a processing path between said plurality of working line memory means, said plurality of working column memory means, said half-wave video frame memory means, and said two-dimensional video frame memory means.

32. A converter as claimed in claim 31, wherein said control means includes means for providing read, write, select, and enable signals, digital address signals, system initialization commands, standard digital bus control signals, and video dynamic random access memory refresh control signals.

33. A converter as claimed in claim 14, wherein said halfway video frame memory means and said two-dimensional video frame memory means comprise dynamic random access memories.

34. A converter as claimed in claim 14, wherein said halfway video frame memory means and said two-dimensional video frame memory means comprise static random access memories.

35. A method of performing a fast Fourier transform conversion, comprising the steps of:
(a) supplying a plurality of fast Fourier transform line processors, sequentially, one line at a time per processor, with image data point sets each representing one line of a two-dimensional image frame until all lines of said image frame have been supplied;
(b) performing a fast Fourier line transform on each of said image data point sets when they are supplied to said line processors to form a plurality of line-transformed image data point sets;
(c) supplying said line-transformed image data point sets to a halfway video frame memory to form a line-transformed image frame;
(d) supplying image data point sets representing columns of said line-transformed image frame from said halfway video frame memory, sequentially, one column at a time per processor, to a second plurality of fast Fourier transform column processors until all columns of said line-transformed image frame have been supplied;
(e) performing a fast Fourier transform column conversion on each of said image data point sets representing columns when said image data point sets representing columns are supplied to said column processors.

36. A method as claimed in claim 35, further comprising the step of storing column-transformed data point sets in a two-dimension video frame memory to form a two-dimensional fast Fourier transformed image frame.

37. A method as claimed in claim 35, wherein step (a) comprises the steps of supplying one line of said image frame to each of said plurality of line processors in sequence until the last of said line processors is supplied, and subsequently supplying the first of said line processors with the next line in a sequence of said image data point sets, said first fast Fourier transform line conversion having been completed by said first line processor simultaneously with the supplying of said last line processor.

38. A method as claimed in claim 35, further comprising the steps of supplying said column processors with a first line-transformed image frame, sequentially column by column, simultaneously with supplying said line processors with a second image frame sequentially, line by line.

39. A method as claimed in claim 35, further comprising the steps of repeating step (a) simultaneously with the performance of step (d).

40. A method as claimed in claim 35, wherein step (a) comprises the steps of supplying said image data point sets to a plurality of working memories, each corresponding to one of said processors, and supplying said image data point sets to said processors from said memories.

41. A method of performing a fast Fourier transform conversion, comprising the steps of:
  (a) supplying a plurality of fast Fourier transform processors, sequentially, one line at a time per processor, with image data point sets each representing one line of a two-dimensional image frame until all lines of said image frame have been supplied;
  (b) performing a fast Fourier line transform on each of said image data point sets when they are supplied to said processors to form a plurality of line-transformed image data point sets;
  (c) supplying said line-transformed image data point sets to a halfway video frame memory to form a line-transformed image frame;
  (d) supplying image data point sets representing columns of said line-transformed image frame from said halfway video frame memory, sequentially, one column at a time per processor, to said processors until all columns of said line-transformed image frame have been supplied;
  (e) performing a fast Fourier transform column conversion on each of said image data point sets representing columns when said image data point sets representing columns are supplied to said processors to form a plurality of column-transformed image data point sets.

42. A method as claimed in claim 41, further comprising the step of storing column-transformed data point sets in a two-dimension video frame memory to form a two-dimensional fast Fourier transformed image frame.

43. A method as claimed in claim 41, wherein step (a) comprises the steps of supplying one line of said image frame to each of said plurality of processors in sequence until the last of said processors is supplied, and subsequentially supplying the first of said processors with the next line in the sequence of line data point sets, said first fast Fourier transform line conversions being completed by said first processor simultaneously with the supplying of said last processor.

44. A method as claimed in claim 41, wherein step (a) comprises the steps of supplying image data point sets to a plurality of working memories, each corresponding to one of said processors, and supplying said image data point sets to said processors from said memories.

45. A digital fast Fourier transform converter, comprising:
  fast Fourier transform processing means including a plurality of one-dimensional fast Fourier transform processors for performing fast Fourier transforms sequentially on a plurality of image data point sets to form a plurality of line-transformed data point sets;
  working memory means comprising a plurality of working memories, each connected to one of said plurality of fast Fourier transform processors for storing one of said data point sets while a respective fast Fourier transform processor to which the respective working memory means is connected performs a fast Fourier transform on one of said data point sets;
  halfway video frame memory means for storing a line-transformed image frame;
  two-dimensional video frame memory means for storing a Fourier transformed image frame;
  a bi-directional internal data bus connected to said plurality of working memory means, said halfway video frame memory means, and said two-dimensional video frame memory means;
  line input means connected to said plurality of working memories for supplying said working memories, sequentially, one line at a time per working memory, with image data point sets, each representing one line of a two-dimensional image frame, for processing by the respective processors to which the working memories are connected;
  line output means for transferring said line-transformed data point sets from said working line memories to said halfway video frame memory means via said bi-directional internal data bus for storage in said halfway video frame memory means as a line-transformed image frame;
  column input means for supplying, via said bi-directional internal data bus, said working memories with image data point sets representing columns of said line-transformed image frame, one column at a time per processor, for processing by the respective processor to which the working memories are connected; and
  column output means connected to said working memories for receiving column transformed data point sets from said working memories and storing them in said two-dimensional video frame memory means in order to form a complete two-dimensional Fourier transformed image frame.

46. A converter as claimed in claim 45, wherein the number of said one-dimensional fast Fourier transform processors in N and the number of said data point sets is greater than N, and further comprising sequencing means for sequencing said processors such that a first of said processors to be supplied with a data point set completes a fast Fourier transform on said data point set at the same time that an Nth data point set is supplied to an Nth processor, the next data point set being supplied to said first processor.

* * * * *